Patented May 1, 1923.

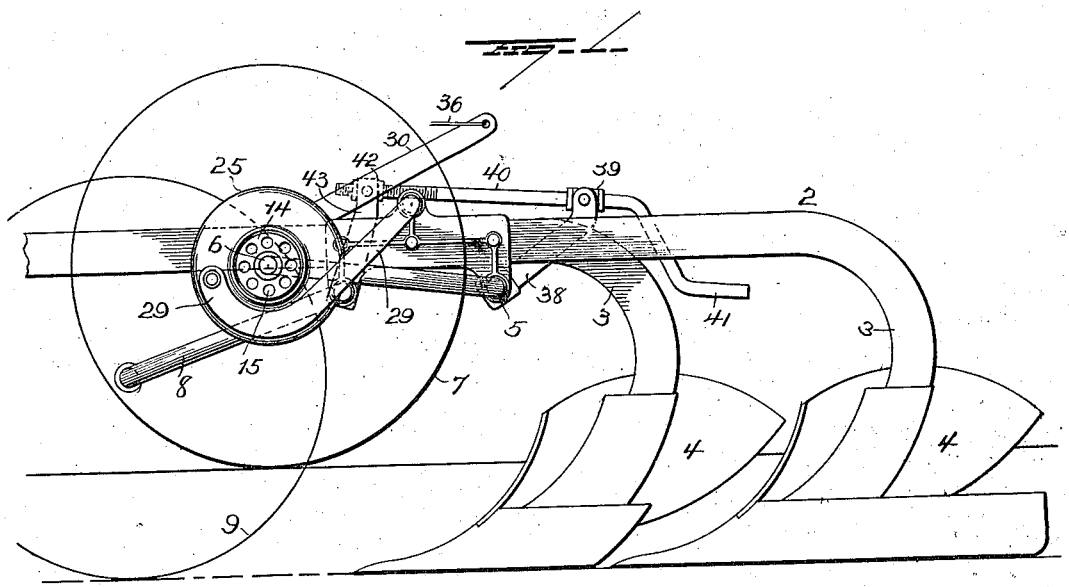
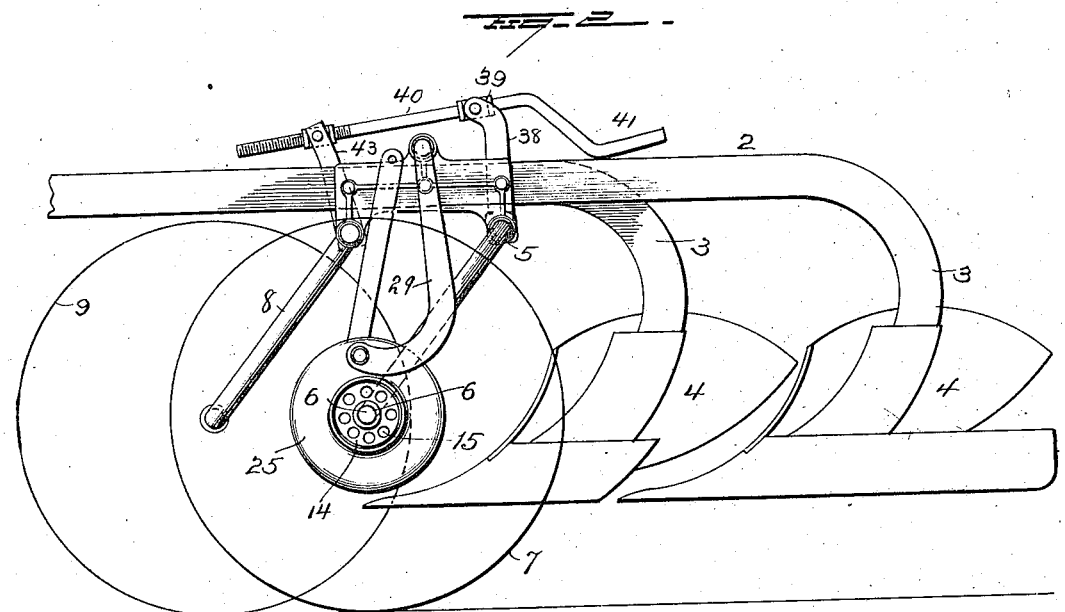

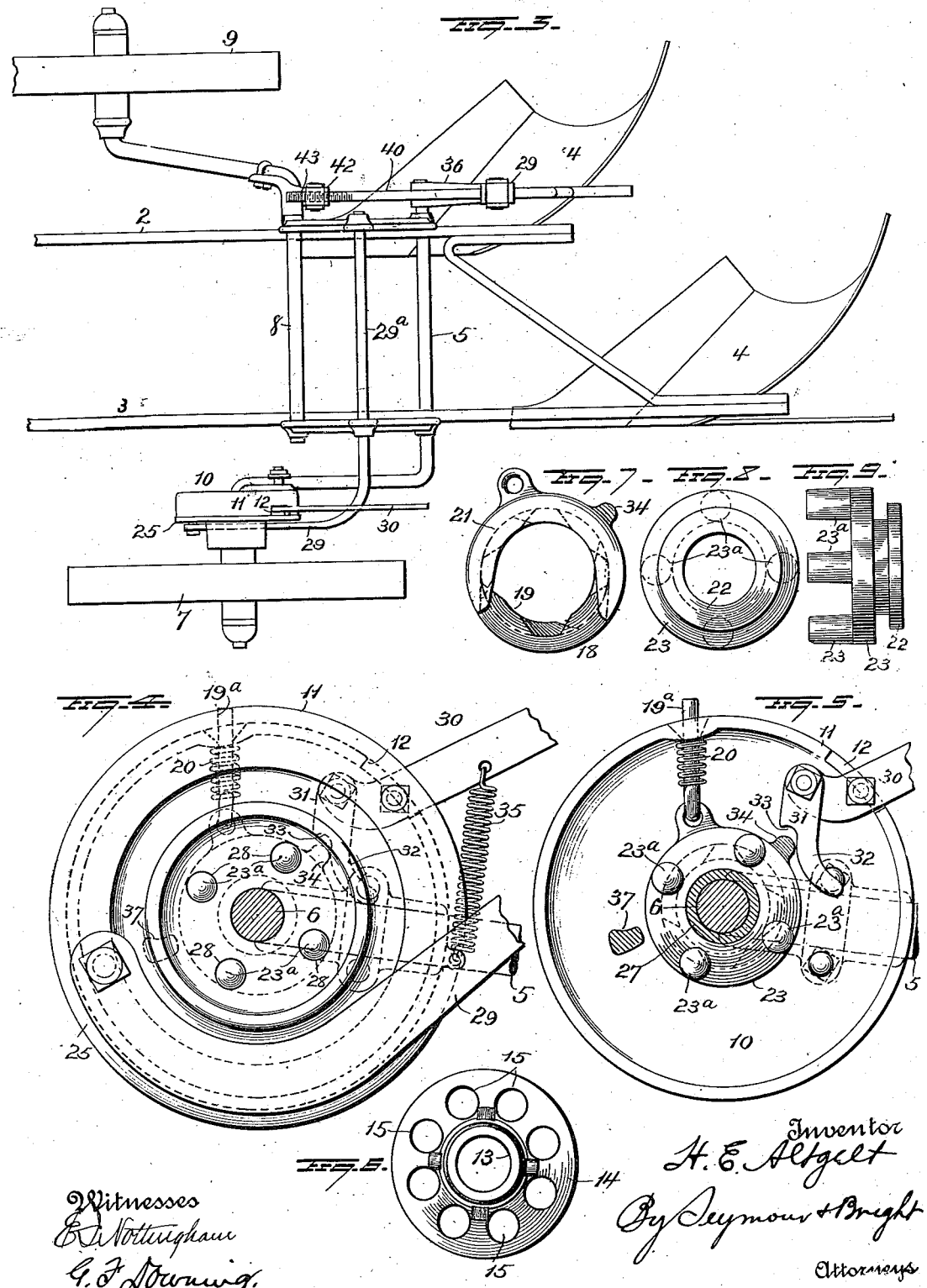

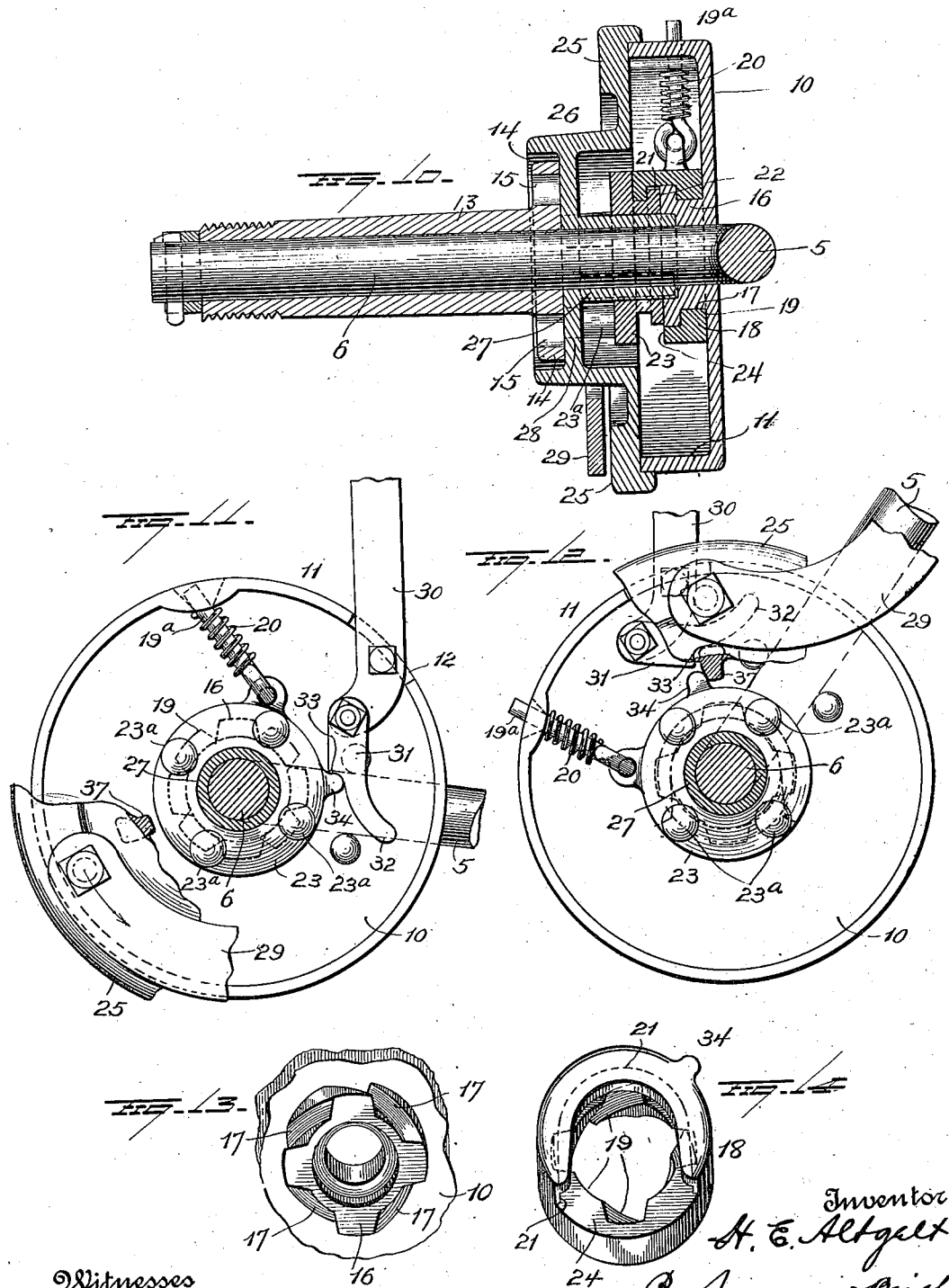

1,453,537

UNITED STATES PATENT OFFICE.

HERMAN E. ALTGELT, OF NEW BRAUNFELS, TEXAS, ASSIGNOR TO OLIVER CHILLED PLOW WORKS, OF SOUTH BEND, INDIANA.

POWER-LIFT MECHANISM FOR PLOWS.

Application filed April 5, 1919. Serial No. 287,756.

*To all whom it may concern:*

Be it known that I, HERMAN E. ALTGELT, a citizen of the United States, and a resident of New Braunfels, in the county of Comal and State of Texas, have invented certain new and useful Improvements in Power-Lift Mechanism for Plows; and I do hereby declare the following to be a full, clear, and exact description of the invention, such as will enable others skilled in the art to which it appertains to make and use the same.

This invention relates to improvements in plows and more particularly to power lift mechanism therefor,—one object of the invention being to provide means whereby a maximum amount of leverage is had and in which the lifting operation may extend throughout approximately three-fourths of a rotation of the carrying wheel from which the power is transmitted.

A further object is to so construct power lift mechanism for an agricultural implement that the frame thereof carrying the earth-working parts, will always be raised to the same height regardless of the depth of penetration of the earth-working means when the lifting member is turned in one direction and so that said lifting member may make as much as approximately three-quarters of a complete rotation when said lifting member turns in the reverse direction during the lowering of the frame.

A further object is to so construct power lift mechanism that both the lifting and lowering of the plow structure shall be accomplished during the forward movement of the plow, but so that the lifting devices shall move alternately in opposite directions during the raising and lowering movements, respectively, of said plow structure.

A further object is to construct a power lift mechanism and connect the same with the plow structure in such manner, that a single piece crank-axle may be employed and its cranked portion located between the plow frame and one of the carrying wheels inwardly from the lift-operating mechanism actuated by said carrying wheel A further object is to so construct wheel-operated power lift mechanism for a plow, that the same shall move alternately in opposite direction during the raising and lowering movements respectively, while the plow is moving forwardly; so that the plow shall be automatically disconnected from the raising means and locked in raised position, and so that the plow may be released from locked position and permitted to descend by gravity.

A further object is to provide wheel operated power lift mechanism for plows which shall be simple in construction; comprise a minimum number of parts and which shall be accurate and effectual in operation.

With these and other objects in view, the invention consists in certain novel features of construction and combinations of parts as hereinafter set forth and pointed out in the claims.

In the accompanying drawings Figure 1 is a side elevation of a plow showing the application of my improvements, with the parts in working positions; Figure 2 is a similar view showing the plow parts in raised position; Figure 3 is a plan view; Figures 4 and 5 are enlarged views showing the positions of parts of the lifting mechanism when the plow is at work; Figure 6 is a view of the wheel box and its perforated flange; Figures 7, 8 and 9 are detail views of the devices for coupling the lifting disk with a carrying wheel of the plow; Figure 10 is a sectional view showing the means for coupling the lifting disk with a carrying wheel and uncoupling the same therefrom; Figure 11 is a view partly in section and partly broken away, showing the positions of the parts at the beginning of the lifting operation; Figure 12 is a similar view showing the positions of the parts when the plow shall have been lifted, and Figures 13 and 14 are detail views showing the cam members which control the coupling and uncoupling of the lifting disk relatively to the carrying wheel 1 represents a plow frame which may comprise in the structure illustrated, two beams 2, 3 suitably spaced apart and braced, and to each of these beams, a plow base 4 is secured. Any suitable means may be provided for connecting the forward end of the plow frame with draft means, such as a tractor (not shown). The horizontal member of a single-piece crank axle 5 is mounted transversely on the plow frame and the spindle portion 6 at the free end of the crank of said axle is mounted in the hub of a carrying wheel 7. Another crank axle 8 mounted on the plow frame has its spindle portion mounted in the hub of a carrying wheel 9.

A housing 10 is rigidly secured to the axle 5 approximately at the juncture of the spindle portion with the crank arm thereof, and this housing may comprise a circular disk having a peripheral flange 11, the latter being notched, as at 12, for a purpose hereinafter explained. The spindle portion 6 of axle 5 passes through the housing 10 and through a wheel box 13 secured within the hub of the wheel 7,—said wheel box being provided at its inner end with an annular flange 14 having a plurality of holes 15 for a purpose hereinafter explained.

Rigid with the inner face of the housing 10 and concentric with the hole therein through which the axle spindle passes, is a hub 16 having an annular series of spiral grooves 17 and encircling this hub is a ring 18 having therein an annular series of spiral ribs 19 to enter the spiral grooves of the hub 16. The spiral grooves and ribs form cams between the housing 10 and the ring 18, so that when the ring is turned, it will be caused also to move in a direction parallel with its axis. A rod 19a is pivotally connected with the ring 18 and is movably connected with the housing 10. A spring 20 encircles the rod 19a and has bearings at its respective ends so that when the ring 18 is turned, it will be retained, by the action of said spring, in the position to which it may be moved.

I have referred to the spiral grooves and ribs of the hub 16 and ring 18, as forming cams between the housing and ring, but it will be apparent that the construction is such that, in the embodiment of the invention shown in the drawing, the connection between the ring 18 and the housing is, in effect, a screw threaded connection.

The ring 18 is made interiorly with a groove 21, in which an annular flange 22 on a ring 23 is rotatively mounted, said ring 18 being also made with a cut-away portion 24 to permit the assembling of said rings.

A disk 25 is mounted loosely on the spindle portion 6 of the axle 5 and is disposed in close proximity to the housing 10, said disk having a recessed enlargement 26 and a hub 27, the latter serving as a mounting for the disk upon the axle spindle. When the parts are assembled, the hub 27 enters the rings 18 and 23, and the latter are adapted, during the operation of the mechanism, to enter the recessed enlargement 26 of the disk. The recessed enlargement 26 is made with a plurality of holes 28 (four such holes being shown in the drawing) through which, pins 23a on the ring 23 pass,—said pins being also adapted to be caused to pass through the holes 15 in the flange 14 of the wheel box 13, to connect the disk with the carrying wheel 7. The ring 23 with the pins 23a thus constitute a locking member for connecting the disk and carrying wheel.

A lifting arm 29 extends downwardly from a shaft 29a mounted transversely on the plow frame. The lower portion of said lifting arm is disposed outside of the disk 25 (between said disk and the wheel 7) and is curved forwardly under the central recessed enlargement 26 of said disk, its lower end being pivotally attached to said disk at a point which is located forwardly of the axis of the axle spindle and the disk when the plow is in working position, as shown in Figure 1.

A control lever 30 is pivotally mounted on the housing 10 and passes through the notched portion 12 thereof. The short arm of this lever enters the housing and has provided thereto, a gravity dog 31 having a tongue 32 and also a tooth 33, the latter being intended to engage a rib or shoulder 34 on the periphery of the ring 18. The control lever is maintained normally in and returned to normal position by the action of a spring 35, attached at one end to said lever and at the other end to the housing 10. To the free end of the control lever, an operating cord 36 is attached. The disk 25 is provided with an inwardly projecting lug 37 adapted to cooperate with the rib or shoulder 34 on the ring 18, for a purpose hereinafter explained.

When the plow is in working position, the parts will assume the positions shown in Figure 1, with the connection of the lifting arm to the disk 23 (which may be termed the lifting disk) located approximately in front of the axis of said disk when the plow is set for deep plowing.

Let it be now assumed that it is desired to raise the plow. The operator will pull the cord 36 to move the control lever forwardly. This will cause the dog 31 to move rearwardly and, by engagement with the rib or shoulder 34, cause the ring 18 to be turned. As the ring 18 is thus turned, its cam or screw connection with the hub 16 of the housing 10, will cause said ring 18 to move outwardly, carrying the ring 23 with it and causing the pins 23a to enter the holes 15 in the flange of the wheel box 13. The rings 18 and 23 will be held in these positions by the action of the spring 20. The lifting disk 25 will now be in locked connection with the wheel box and therefore with the wheel 7 and as the plow moves forwardly, the disk 25 will rotate with the wheel 7 and motion will be imparted through the lifting arm 29 to the plow frame to raise the plows. During such raising operation, the pivotal connection of the lifting arm with the lifting disk will move from the position shown in Figure 1 to the position shown in Figure 2 and thus the lifting action will extend throughout approximately three-fourths of a rotation of the disk 25 and the wheel 7, thereby enhancing the efficiency of the lifting mechanism to raise the plow to its full height during a long continued and gradual application of power derived from the carrying wheel. During the raising of the plow, the cranks of the axles will move from the positions shown in Figure 1 to the positions shown in Figure 2 and as the pivotal connection of the lifting arm with the lifting disk approaches a position slightly past a dead center over and with relation to the axis of said disk, the lug 37 on the disk 25 will engage the tongue 32 of dog 31, raise the latter and engage the rib or shoulder 34 on the ring 18, thus causing the latter to be turned (overcoming the resistance of the spring 20) and causing said ring to move inwardly by the action of the cam or screw connection with the housing and the pins 32ª on the ring 23 to be withdrawn from engagement with the wheel box. The plow will now be held in its raised position (as shown in Figure 2) and the carrying wheel 7 will be free to rotate on the axle spindle. To lower the plow, the operator will again move the control lever forwardly. Such operation of the control lever will cause the dog 31 to engage the lug 37 on the disk and turn said disk sufficiently to move the pivotal connection of the lifting arm with said disk past the dead center, when the plow will descend by gravity and the disk turn to the normal position which it assumes when the plow is at work as shown in Figure 1.

It will be observed that with my improvements, the axle of the wheel from which power is derived can be made in a single piece; that the lifting operation extends throughout approximately three-fourths of a rotation of the carrying wheel and that such long-continued application of power is made possible by reason of the fact that the lifting disk never makes a complete rotation in the same direction but turns alternately in opposite directions during the raising and lowering operations respectively.

An arm 38 may be secured to axle 5 and carries a pivoted sleeve 39 in which a shaft 40 is mounted. This shaft may be provided at one end with a crank 41 and its other end portion is threaded and passes through an internally threaded sleeve 42 pivotally supported by an arm 43 secured to the furrow wheel axle 8. By means of these devices, the plow may be leveled and they also serve to transmit movement from the axle 5 to the axle 8 during the raising and lowering operations.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In an agricultural implement in which the earth working means are raised by power and lowered by gravity, the combination with a frame, earth working means, a wheel and an axle, of an oscillatory lifting member, means for connecting said lifting member with the wheel, and a lifting arm rigid from end to end and pivotally connected at its respective ends to said oscillatory member and with the frame, whereby said lifting member may make as much as approximately three quarters of a complete rotation when said lifting member turns in one direction or the other in effecting the raising of the plow or in permitting it to lower.

2. In an agricultural implement in which the earth working means are raised by power and lowered by gravity, the combination with a frame, an axle, and a carrying wheel, of an oscillatory lifting member loose on the axle, a rigid lifting arm pivoted to the frame and pivoted directly to said oscillatory lifting member whereby the plow may be raised during approximately three-fourths of a rotation of said lifting member, and means for connecting said lifting member with the carrying wheel so that it will turn with the latter.

3. In an agricultural implement in which the earth working means are raised by power and lowered by gravity, the combination with a frame, an axle and a carrying wheel, of an oscillatory lifting member loose on the axle, means for locking said oscillatory lifting member to the carrying wheel, and a lifting arm pivotally connected with the frame and having a part rigid with its lower end portion pivotally connected directly with the lifting member, such pivotal connection being in advance of the axis of said lifting member when the implement is in working position.

4. In an agricultural implement of the character described, the combination with a frame, an axle and a carrying wheel, of an oscillatory lifting member loose on the axle, means for locking said member to the carrying wheel, and a rigid lifting arm pivotally connected with the frame, said lifting arm extending between the carrying wheel and lifting member and pivotally connected directly with the outer face of the latter.

5. In an agricultural implement of the character described, the combination with a frame and a carrying wheel, of a one-piece crank axle having a spindle portion mounted in the hub of said carrying wheel, a lifting member loose on the spindle portion of said axle, means for locking said lifting member to the carrying wheel, and a rigid lifting arm pivotally connected with the frame and extending between the carrying wheel and lifting member, the lower portion of said lifting arm having a forwardly extending portion rigid with its lower end and pivotally connected directly with said lifting member.

6. In an agricultural implement in which the earth working means are raised by power and lowered by gravity, the combination with a frame, an axle and a carrying wheel, of a lifting member loose on the axle, means for locking said lifting member to the carrying wheel, and a rigid lifting arm connected with the plow frame and extending outside of said lifting member, said lifting arm having a forwardly curved lower end portion pivotally connected directly with the lifting member in advance of the axis of said member, whereby the plow frame will be raised during approximately a three-quarters rotation of said lifting member and the carrying wheel.

7. In an agricultural implement in which the earth working means are raised by power and lowered by gravity, the combination with a frame, an axle and a carrying wheel, of a lifting disk loose on the axle, means for locking said disk to the carrying wheel, a shaft mounted on the plow frame, and a rigid lifting arm depending from one end of said shaft and pivotally connected directly with the lifting disk in advance of the plane of the axis of said disk.

8. In an agricultural implement in which the earth working means are raised by power and lowered by gravity, the combination with a frame, an axle and a carrying wheel, of a disk mounted loosely on the axle, a rigid lifting arm pivotally connected with the frame and having a direct pivotal connection with said disk, and means whereby said disk may be turned more than a half rotation in one direction during the lifting of the frame and permitted to turn more than a half rotation in the reverse direction during the lowering of the frame.

9. The combination with the frame of an agricultural implement, an axle and a carrying wheel, of a disk loose on the axle, means for locking said disk to the carrying wheel, an arm connected with said disk and with the frame, whereby the latter will be raised when said disk is turned in one direction until the connection of said arm with the disk approximately passes a dead center relatively to the axis of the disk, and means whereby the disk is disconnected from the carrying wheel when the frame reaches its raised position, a portion of said means being operable to move the disk past said dead center position and permit the frame to drop by gravity and effect reverse movement of said disk and lifting arm.

10. The combination with a frame of an agricultural implement, an axle and a carrying wheel, of a disk loose on the axle, means for locking said disk to the carrying wheel, an arm connected with said disk and with the frame whereby the latter will be raised when the disk is turned in one direction until the connection of said arm with the disk approximately passes a dead center relatively to the axis of the disk, and means whereby the disk is disconnected from the carrying wheel when the frame reaches its raised position, a portion of said means being operable to move the disk past said dead center position and permit the frame to drop by gravity and effect reverse movement of said disk and lifting arm.

In testimony whereof, I have signed this specification in the presence of two subscribing witnesses.

HERMAN E. ALTGELT.

Witnesses:
ADOLF STEIN,
ALB. NOWOTNY.